Figure 1:
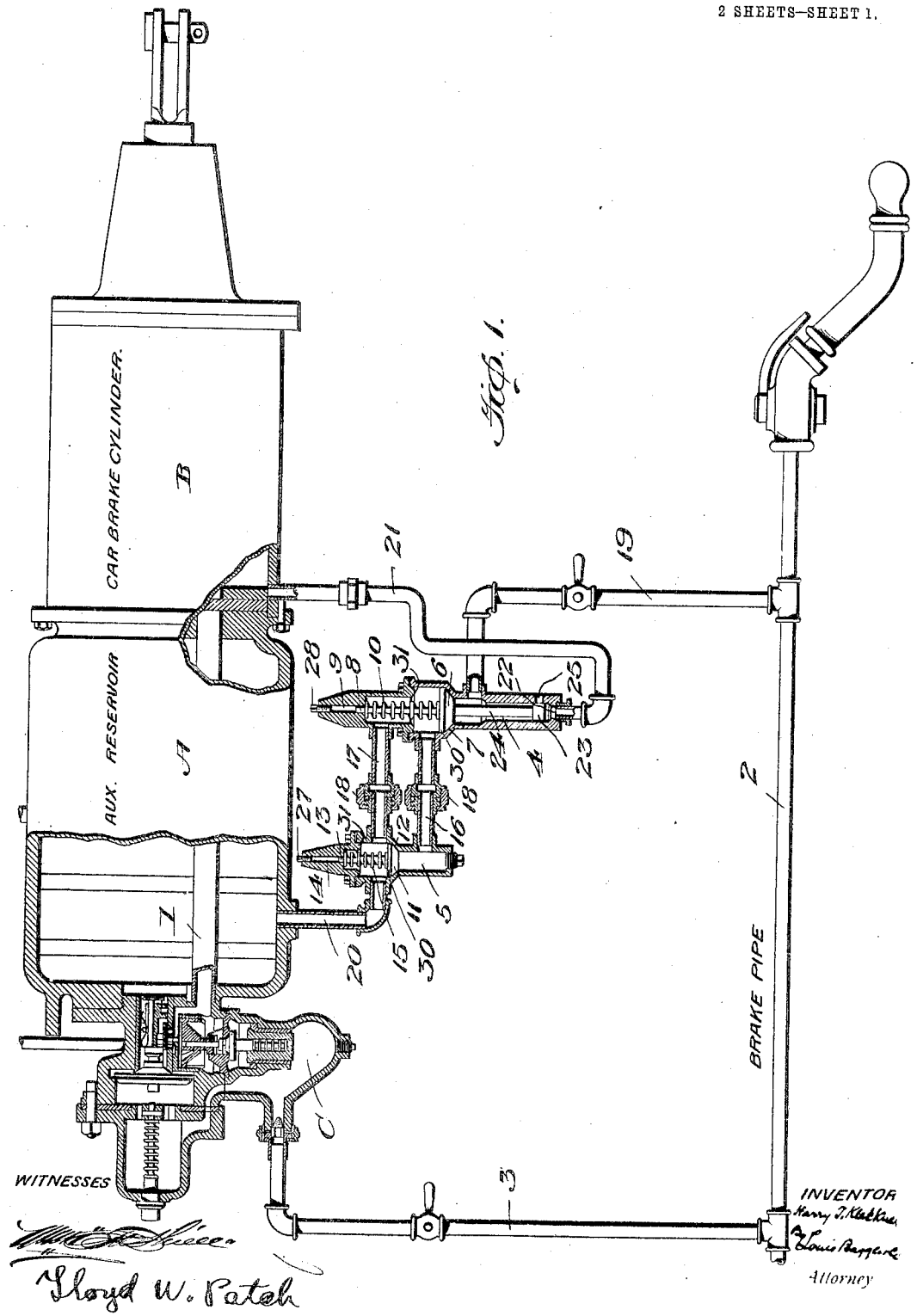

H. T. KLECKNER.
APPARATUS FOR THE RECHARGING OF AUXILIARY RESERVOIRS OF AIR BRAKE SYSTEMS.
APPLICATION FILED MAY 15, 1912.

1,082,344.

Patented Dec. 23, 1913.

2 SHEETS—SHEET 1.

WITNESSES

INVENTOR

H. T. KLECKNER.
APPARATUS FOR THE RECHARGING OF AUXILIARY RESERVOIRS OF AIR BRAKE SYSTEMS.
APPLICATION FILED MAY 15, 1912.
1,082,344.
Patented Dec. 23, 1913.
2 SHEETS—SHEET 2.
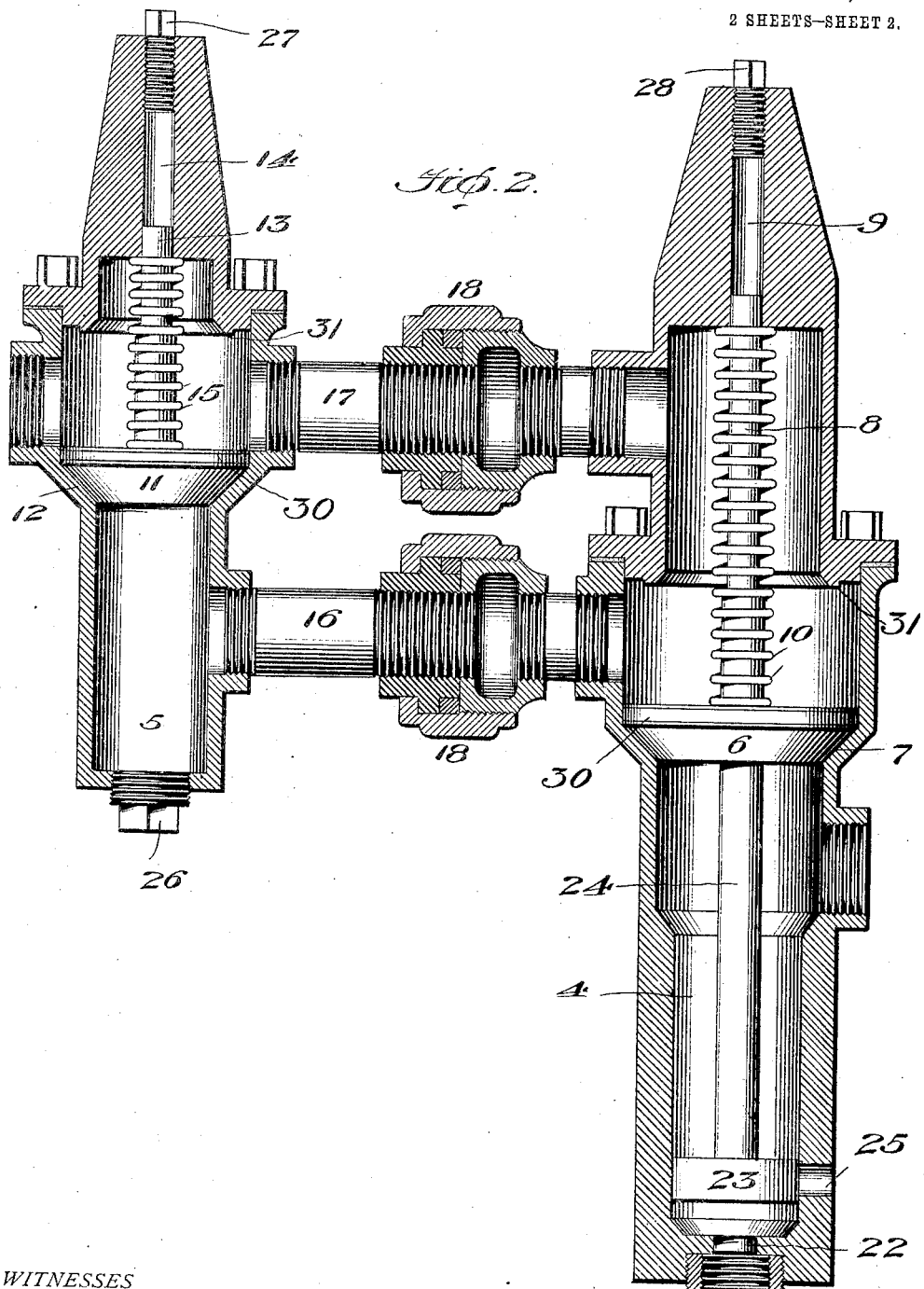

UNITED STATES PATENT OFFICE.

HARRY TILGHMAN KLECKNER, OF SHAMOKIN, PENNSYLVANIA, ASSIGNOR OF ONE-TENTH TO DAVID ACKER, OF PORT CLINTON, PENNSYLVANIA, AND ONE-TENTH TO WILLIAM ROGERS, OF SHAMOKIN, PENNSYLVANIA.

APPARATUS FOR THE RECHARGING OF AUXILIARY RESERVOIRS OF AIR-BRAKE SYSTEMS.

1,082,344.

Specification of Letters Patent.   Patented Dec. 23, 1913.

Application filed May 15, 1912.   Serial No. 697,492.

*To all whom it may concern:*

Be it known that I, HARRY T. KLECKNER, a citizen of the United States, residing at Shamokin, in county of Northumberland and State of Pennsylvania, have invented certain new and useful Improvements in Apparatus for the Recharging of Auxiliary Reservoirs of Air-Brake Systems, of which the following is a specification.

My invention relates to an improvement in recharging of the auxiliary reservoirs of the air brake system and the object is to provide an attachment which has connection with the brake pipe and the auxiliary reservoir independent of any connection with the triple valve.

The invention consists of certain novel features of construction and combinations of parts which will be hereinafter described and pointed out in the claims.

In the accompanying drawings—Figure 1 is a diagrammatic view showing my attachment in section and connected up with the brake pipe, the auxiliary reservoir and with the brake cylinder of a car, the brake cylinder reservoir and triple valve being shown in section. Fig. 2 is an enlarged vertical sectional view of the invention.

A represents the auxiliary reservoir of an air brake system and B is the car brake cylinder. A triple valve C is connected to the auxiliary reservoir in the usual manner and to the car brake cylinder by a pipe 1 in the ordinary manner. The usual brake pipe 2 through which the air is fed from the engine has a cross-over pipe 3 connected thereto leading to the triple valve. The brake pipe 2, the cross-over pipe 3, the triple valve C, the auxiliary reservoir A, and the car brake cylinder B are of the usual construction and as disclosed in Fig. 1 are the forms applied by the standard system to a freight car, and these parts form no part of my invention with the exception of the connection which my apparatus has with respect to them and which coöperates with them in the recharging of the auxiliary reservoir and the working of the system.

The invention consists of a valve casing composed of two chambers 4 and 5. The main chamber 4 is provided with a valve 6 normally seated on a valve seat 7 formed in the chamber. A valve stem 8 is connected to the valve 6 and slides in the opening 9 formed in the head or upper end of the chamber 4 for guiding the movement of the valve 6. A coil spring 10 is mounted upon the stem and is held between the head of the chamber and the upper surface of the valve 6. The chamber 5 is provided with a valve 11 which is normally seated upon a valve seat 12 and is provided with a valve stem 13 which slides in the opening 14 in the head of the valve chamber. A spring 15 is connected to the stem and is held between the head of the chamber and the upper surface of the valve 11. The chambers 4 and 5 are connected together by pipes 16 and 17 which are provided with couplings 18 whereby the two chambers may be disconnected at any time and repaired if necessary, or a new chamber substituted.

The valves 6 and 11 are provided with packing rings 30, which insures the valves having a tight fit within the bores of their respective chambers 4 and 5. The heads or upper ends of the chambers 4 and 5 are provided with annular shoulders 31 against which the valves 6 and 11 come in contact when raised or moved from their respective seats 7 and 12.

The pipe 16 is connected to the main chamber 4 above the normal position of the valve 6 and is connected to the valve chamber 5 beneath the valve 11 while the pipe or conduit 17 is connected above the valve 11 of the chamber 5 and above the valve 6. A cross-over pipe 19 connects the brake pipe of the brake system to the main chamber 4 below the valve 6 and a pipe 20 connects the valve chamber 5 above the valve 11 with the auxiliary reservoir A. When the air or fluid is admitted through the pipe 19 to valve chamber 4 it will cause the valve 6 to rise, admitting the air to pass through the pipe 16 into the valve chamber 5 thereby causing the valve 11 to be raised and the air will thence pass through the pipe 20 into the auxiliary reservoir for assisting in the recharging of the reservoir. After the auxiliary reservoir has received the proper amount of air or fluid, which is equal to the fluid pressure in the brake pipe 2, the valve 11 will close, due to the equalizing of the pressures in the auxiliary reservoir and in the brake pipe 2. If for any reason the valve 6 should not fall the air will pass through the conduit 17 from the auxiliary reservoir to the upper side of the valve 6 and cause it to seat upon the valve seat 7 thereby closing the passage of air to the valve chamber 5 and the air is shut off from the auxiliary reservoir. The springs 10 and 15 assist in causing the valves 11 and 6 to close, although they may be dispensed with, but it has been found advisable to use them to insure the seating of the valves.

A port 22 is formed in the bottom of the main chamber 4 and connected to the port is a pipe 21 which pipe is connected to the brake cylinder B. A valve 23 snugly fits within the bore of the chamber 4, and is connected to the valve 6 by a stem 24. The valve 23 normally closes the port 22 so that the air in the brake cylinder cannot escape through the pipe 21 when the air is caused to be introduced into the brake cylinder for applying the brakes. When the brakes are released, the valves 23 and 6 will be caused to move upward by the air entering the valve chamber 4 through the pipe 19, and as the valve 23 moves upward it opens the ports 22 and 25 thereby permitting the air from the brake cylinder to enter the chamber 4 through the pipe 21 and port 22, the air then passing to the atmosphere through the port 25. This valve 23 and the connection which the chamber 4 has with the brake cylinder is very important for the reason that with the air being admitted to the auxiliary reservoir through the pipe 19 and valve casing as well as through the triple valve, a supply of air would be admitted to the reservoir which would prevent the valve from acting sufficiently to allow the escape of the air from the brake cylinder, but with this additional connection of the pipe 21 with the valve chamber 4 the air can be discharged from the brake cylinder without any possibility of the brakes setting due to the fact that the auxiliary reservoir is being recharged more rapidly than is possible with the ordinary method of passing the air through the triple valve.

With this apparatus the auxiliary reservoir can be re-supplied with air more rapidly than in the present system in vogue of introducing the air through the triple valve and by providing means whereby the auxiliary reservoir can be recharged more rapidly, the brakes can be used again in less time than in the present method. Several minutes are required for the recharging of the auxiliary reservoir with the present method in vogue, and if for any reason it is necessary to reset the brakes there is not enough air in the reservoir to cause the brakes to be applied, and it is for this reason that I have adopted this device for recharging the reservoir so that the brakes can be applied quickly or within a short time after they have been released. From this it will be seen that unless some provision was made for conducting the air from the brake cylinder besides the method now used of passing it through the triple valve, the auxiliary reservoir would receive its supply of air before all of the air could be discharged from the brake cylinder, and it is to overcome this difficulty that I have provided a connection between the brake cylinder and my main valve chamber so that the air from the brake cylinder can be discharged through the main valve chamber to the atmosphere during the time the auxiliary reservoir is being recharged as the valve 23 will open the ports 22 and 25 as soon as the air is admitted for the recharging of the auxiliary reservoir.

Another feature of this invention is in the provision of the valves 6 and 11. If for any reason one of the valves should fail to become seated to prevent the escape of air from the auxiliary reservoir, the other would act. The valve 11 will act first and when the passage 16 is closed, the air from the reservoir will pass thereover and force the valve 6 down and insure the setting of the valve as the air will flow directly over the top of valve 6 and cause it to become seated. The valve 6 will, under ordinary conditions, seat itself the same as the valve 11, but to overcome any possibility or failure of the valve 6 to work, I have provided the valve 11 to insure the closing of the port and prevent the escape of air from the auxiliary reservoir.

A plug 26 is connected to the bottom of the chamber 5 whereby the chamber can be cleaned of any foreign matter which may enter the chamber, and I have provided plugs 27 and 28 in the heads of the chambers 5 and 4 respectively whereby oil can be introduced for lubricating the valve stems 8 and 13.

Having thus described my invention, what I claim as new and desire to secure by Letters Patent is—

1. The combination with an auxiliary reservoir and an air supply means of an air brake system, of a valve casing consisting of valve chambers in communication with each other by conduits, means connecting one of said chambers to the auxiliary reservoir and means connecting the other chamber to the air supply means, a valve in each chamber adapted to be raised upon the charging of the auxiliary reservoir, said valves adapted to be seated when an equalizing pressure is reached between the auxiliary reservoir and the air supplying means, one of said passages being in communication with the auxiliary reservoir causing the air of the auxiliary reservoir to act upon one of said valves to cause said valve to be seated.

2. The combination with a brake cylinder, an auxiliary reservoir, and an air supplying means of an air brake system, of a valve casing connected to the auxiliary reservoir and said air supplying means for the recharging of the auxiliary reservoir means connected to the brake cylinder and said valve casing for conducting the air from the brake cylinder upon the release of the brakes, and means controlled by the air passing through the valve casing for governing the passage of air from the brake cylinder to the valve casing.

3. The combination with a brake cylinder, an auxiliary reservoir, and an air supplying means of an air brake system, of a valve casing connected to the auxiliary reservoir and said air supplying means for the recharging of the auxiliary reservoir and means connected to the brake cylinder and said valve casing for conducting the air from the brake cylinder upon the release of the brakes, and a valve in the valve casing for controlling the discharge of air from the brake cylinder to the atmosphere upon the release of the brakes, said valve actuated by the air from the air-supply means as the air passes through the valve casing to the auxiliary reservoir to allow the air from the brake cylinder to be discharged to the atmosphere.

4. The combination with an auxiliary reservoir, brake cylinder and air supply pipe, and a triple valve connected to and in communication with the auxiliary reservoir, a pipe connecting the triple valve with the brake cylinder and a pipe connecting the air supply pipe with the triple valve, of a valve casing in communication with the auxiliary reservoir and air supply pipe, valves in the casing for controlling the admission of air to the reservoir and means connecting the brake cylinder with the valve casing acting in connection with the triple valve for discharging the air from the brake cylinder to release the brakes.

5. The combination with a brake cylinder, auxiliary reservoir and air supply means, of a valve casing, means connecting the valve casing with the auxiliary reservoir, a valve in the casing for controlling the supply of air to the reservoir, means connecting the valve casing to the brake cylinder for conducting the air from the brake cylinder upon the releasing of the brakes to the atmosphere and a valve connected to said first named valve for controlling the discharge of the air from the brake cylinder.

In testimony whereof I affix my signature, in the presence of two witnesses.

HARRY TILGHMAN KLECKNER.

Witnesses:
HARRY WEITZEL,
HARVEY MORGAN.

---

Copies of this patent may be obtained for five cents each, by addressing the "Commissioner of Patents, Washington, D. C."